(12) United States Patent
Han et al.

(10) Patent No.: US 10,659,162 B2
(45) Date of Patent: May 19, 2020

(54) PHOTONIC MICROWAVE DOWN-CONVERSION SYSTEM AND METHOD

(71) Applicant: Dalian University of Technology, Dalian (CN)

(72) Inventors: Xiuyou Han, Dalian (CN); Yuchen Shao, Dalian (CN); Zhenlin Wu, Dalian (CN); Mingshan Zhao, Dalian (CN)

(73) Assignee: DALIAN UNIVERSITY OF TECHNOLOGY, Dalian, Liaoning (CN)

( * ) Notice: Subject to any disclaimer, the term of this patent is extended or adjusted under 35 U.S.C. 154(b) by 0 days.

(21) Appl. No.: 16/461,713

(22) PCT Filed: Jan. 5, 2018

(86) PCT No.: PCT/CN2018/071520
§ 371 (c)(1),
(2) Date: May 16, 2019

(87) PCT Pub. No.: WO2019/109455
PCT Pub. Date: Jun. 13, 2019

(65) Prior Publication Data
US 2020/0112370 A1 Apr. 9, 2020

(30) Foreign Application Priority Data

Dec. 4, 2017 (CN) .......................... 2017 1 1258210

(51) Int. Cl.
*H04B 10/00* (2013.01)
*H04B 10/2575* (2013.01)
(Continued)

(52) U.S. Cl.
CPC ..... *H04B 10/2575* (2013.01); *H04B 10/5057* (2013.01); *H04B 10/548* (2013.01); *H04B 10/616* (2013.01)

(58) Field of Classification Search
CPC .......... H04B 10/2575; H04B 10/25752; H04B 10/25753; H04B 10/25759; H04B 10/564;
(Continued)

(56) References Cited

U.S. PATENT DOCUMENTS

| 7,245,833 B1* | 7/2007 | Volkening | .......... H04B 10/2575 |
| | | | 398/116 |
| 9,680,576 B1 | 6/2017 | Middleton et al. | |
| 2010/0028012 A1* | 2/2010 | Ng | ..................... H04B 10/2575 |
| | | | 398/116 |

FOREIGN PATENT DOCUMENTS

| CN | 101303506 A | 11/2008 |
| CN | 103684618 A | 3/2014 |
| CN | WO2015132772 A2 | 9/2015 |

OTHER PUBLICATIONS

Search Report and Written Opinion dated Dec. 4, 2017, in International Application No. PCT/CN2018/071520.

* cited by examiner

*Primary Examiner* — Hanh Phan
(74) *Attorney, Agent, or Firm* — Muncy, Geissler, Olds & Lowe, PC

(57) ABSTRACT

A photonic microwave down-conversion system and method. The oscillation loop includes an electro-optic modulator, optical narrow-band notch filter, photodetector and electrical combiner which has the function of generating the local oscillator signal. The frequency of the local oscillator signal can be flexibly adjusted by changing the lightwave frequency output from the wavelength tunable laser. The phase modulation function of the electro-optic modu-
(Continued)

lator enables no RF signal output from the down-conversion photodetector It can not only down convert the RF signals with different frequencies to the intermediate frequency signals with the same frequency, but also can down convert the RF signals with the same frequency to the intermediate frequency signals with different frequencies. This can effectively overcome the limitations of complicated structure, poor RF isolation and difficulty in flexible tuning for microwave down-conversion system in the prior arts.

6 Claims, 5 Drawing Sheets

(51) Int. Cl.
      *H04B 10/61*           (2013.01)
      *H04B 10/548*         (2013.01)
      *H04B 10/50*          (2013.01)

(58) Field of Classification Search
      CPC .............. H04B 10/548; H04B 10/5165; H04B 10/616; H04B 10/572; H04B 10/503; H04J 14/0298
      USPC ....... 398/115, 116, 182, 183, 187, 188, 140, 398/158, 159, 76, 198, 196
      See application file for complete search history.

PHOTONIC MICROWAVE DOWN-CONVERSION SYSTEM AND METHOD

TECHNICAL FIELD

The present invention relates to the technical field of microwave signal processing, and especially relates to a photonic microwave down-conversion system and method.

BACKGROUND

The microwave down-conversion is one of the key technologies for microwave signal processing. The function is to convert the frequency of the RF signal received by the antenna to the intermedia frequency range that can be processed subsequently. Microwave down-conversion technology has extensive and important applications in satellite communications, wireless communications, radar and so on. The traditional microwave down-conversion technology based on electrical method is mainly realized by the non-linear functions of electronic devices such as diodes or field effect transistors. The processing range and bandwidth might be limited by the performance of the electrical device. As the microwave frequency increases, the conversion efficiency based on the electrical method might be reduced, and the phase noise may be deteriorated, which greatly impacts the quality of the down-converted signal.

The microwave photonic technology by combining the complementary advantages of the photonic and microwave technology provides a promising solution for microwave down-conversion processing. The microwave photonic down-conversion technology can fully exert the advantages of photonic technology, such as large bandwidth, low loss, tunablility and multiplexing. It has good immunity to electromagnetic interference and has great potential in reducing the size and power consumption of down-conversion system, and enhancing the frequency conversion performance.

The microwave photonic frequency down-conversion scheme based on cascaded $LiNO_3$ modulators has been studied in prior art [1] (M. M. Howerton, R. P. Moeller, G. K. Gopalakrishnan, and W. K. Burns. "Low-biased fiber-optic link for microwave downconversion", IEEE Photonics Technology Letters, Vol. 8, No. 12, pp. 1692-1694, December 1996). The external electrical local oscillator (LO) signal and the RF signal are modulated onto the optical carrier from the laser through two cascaded $LiNO_3$ modulators, respectively. Then, the intermediate frequency (IF) signal is obtained by frequency beating between the electrical LO signal and the RF signal carried on the optical carrier in the photodetector. The external electrical LO source and two $LiNO_3$ modulators are needed, which may increase system complexity. On the other hand, the gain characteristics of the frequency down-conversion would be degraded due to the added optical insertion loss of the fiber connection between two modulators.

The microwave photonic frequency down-conversion technology based on a single integrated double parallel Mach-Zehnder modulator (DP-MZM) has been investigated in prior art [2] (Erwin H. W. Chan and Robert A. Minasian. "Microwave photonic downconverter with high conversion efficiency", IEEE Journal of Lightwave Technology, Vol. 30, No. 23, pp. 3580-3585, December 2012). The DP-MZM consists of two sub MZM modulators (MZM1 and MZM2) embedded in the main Mach-Zehnder interference arms. The external electrical LO signal and the RF signal are respectively modulated to the lightwave output from the laser through MZM1 and MZM2. Compared with the prior art [1], the scheme implements two independent intensity modulation in one integrated device. The integrated optical waveguide shortens the transmission interval between discrete devices, the number of fiber couplings are reduced, and the optical loss could be reduced. The system structure is simplified, which is beneficial to improve the down-conversion gain. However, an external LO source is still needed, and the external DC bias controllers for MZM1 and MZM2 are needed to stabilize the carrier suppression operation condition, which may increase the system complexity.

The scheme based on the optoelectronic oscillator (OEO) composed of a single integrated double driver Mach-Zehnder modulator (DD-MZM) for microwave photonic frequency down-conversion has been studied in prior art [3] (Zhenzhou Tang, Fangzheng Zhang, and Shilong Pan. "Photonic microwave downconverter based on an OEO using a single dual-drive Mach-Zehnder modulator", Optics Express, Vol. 22, No. 1, pp. 305-310, January 2014). In the scheme, the LO signal is generated by the OEO consisting of a RF input port of the DD-MZM, optical fiber, photodetector and electrical filter. The RF signal received by the antenna is modulated on the lightwave from the laser through another RF input port of the DD-MZM. The IF signal is obtained by the frequency beating between the RF signal and the LO signal generated by the OEO via the second photodetector. No external electrical LO signal source is needed in the scheme. The modulation function of the LO signal generated by the OEO loop and the RF signal received by the antenna is implemented by a single integrated DD-MZM, which simplifies the system structure. However, the LO signal frequency is selected by the electrical filter, which may be difficult to be tuned flexibly. On the other hand, the RF signal can also be recovered after photoelectric conversion, which is unable to achieve the complete RF isolation.

SUMMARY

The invention provides a photonic microwave down-conversion system and method, which effectively overcome the limitations of complicated structure, poor RF isolation and difficulty in flexible tuning for microwave down-conversion system in the prior arts.

The technical solution of the proposed invention is as follows:

A photonic microwave down-conversion system consists of a wavelength tunable laser 1, an electro-optic modulator 2, an optical narrow-band notch filter 3, an optical splitter 4, the first photodetector 5, an electrical combiner 6, the second photodetector 7, and an electrical low-pass filter 8.

The wavelength tunable laser 1, the electro-optic modulator 2, the optical narrow-band notch filter 3, the optical splitter 4 and the first photodetector 5 are connected in sequence by optical fibers.

The first photodetector 5 and the electrical combiner 6 are connected by a cable.

The electro-optic modulator 2, the optical narrow-band notch filter 3, the optical splitter 4, the first photodetector 5, and the electrical combiner 6 are connected in sequence to establish an oscillation loop.

The optical splitter 4 and the second photodetector 7 are connected by an optical fiber.

The second photodetector 7 and the electrical low-pass filter 8 are connected by a cable.

The photonic microwave down-conversion system consisting of the optical splitter 4 and the first photodetector 5 is a single-loop optical fiber connection, double-loop optical fiber connection or multiple-loop fiber connection.

The electro-optic modulator 2 is the electro-optic modulator having the phase modulation function.

The electro-optic modulator 2, optical narrow-band notch filter 3, optical splitter 4, the first photodetector 5, and the electrical combiner 6 are connected in sequence to establish the oscillation loop. It has the function of generating a local oscillator signal, namely LO signal. The frequency of the generated LO signal $f_{LO}$ is determined by the lightwave frequency $f_C$ of the wavelength tunable laser 1 and the notch center frequency $f_N$ of the optical narrow-band notch filter 3, which satisfies the following relationship:

$$f_{LO}=f_C-f_N \quad (1).$$

A photonic microwave down-conversion method is characterized that the implementation steps are as follows.

The optical carrier with the frequency of $f_C$ output from the wavelength tunable laser 1 is fed to the optical input port of the electro-optic modulator 2. The RF signal received by the antenna and the LO signal returned from the first photodetector 5 in the oscillation loop are combined together via the electrical combiner 6 and fed to the RF input port of the electro-optic modulator 2. The RF signal and the LO signal are modulated on the optical carrier via the electro-optic modulator 2. The optically carried phase modulation microwave signals output from the electro-optic modulator 2 are fed to the optical narrow-band notch filter 3. The right sideband of the optically carried LO signal is filtered out by the optical narrow-band notch filter 3. The optically carried microwave signals are divided into two paths via the optical splitter 4. The first path enters the first photodetector 5 and the second path enters the second photodetector 7.

The optically carried microwave signals are converted into electrical domain by the first photodetector 5. The LO signal is generated by frequency beating between the left sideband and the optical carrier of the optically carried LO signal. The frequency of the LO is $f_{LO}=f_C-f_N$. The left and right sidebands of the optically carried RF signal have a phase difference of t due to the inherent property of phase modulation. Therefore, the left and right sidebands of the optically carried RF signal cancel each other after frequency beating and no RF signal is output. The LO signal output from the first photodetector 5 is fed to the RF input port of the electro-optic modulator 2 via the electrical combiner 6, thus the LO signal oscillates back and forth in the loop and high quality LO signal with low phase noise is generated. The frequency of LO signal $f_{LO}$ can be tuned by changing the frequency $f_C$ of the optical carrier output from the wavelength tunable laser 1.

The optically carried microwave signals from the second path separated from the optical splitter 4 are converted into electrical domain via the second photodetector 7. The left and right sidebands of the optically carried RF signal have a phase difference of it due to the inherent property of phase modulation. Therefore, the left and right sidebands of the optically carried RF signal cancel each other after frequency beating and no RF signal is output from the second photodetector 7. The complete RF isolation is achieved.

In the second photodetector 7, the intermediate frequency (IF) signal is generated by the frequency beating between the left sidebands of optically carried LO and RF signals. The frequency of IF signal is:

$$f_{IF}=f_{RF}-f_{LO} \quad (2).$$

The LO signal is generated by frequency beating between the left sideband and the optical carrier of the optically carried LO signal. The LO signal output from the second photodetector 7 is filtered out by the electrical low-pass filter 8, and the IF signal is obtained. The frequency of the down-converted IF signal $f_{IF}$ can be adjusted by changing the frequency of the LO signal $f_{LO}$, that is, by changing the frequency of the optical carrier $f_C$ from the wavelength tunable laser 1. As a result, the tunable down-conversion function is completed.

The benefit of the invention:

(1) The optoelectronic oscillation loop composed of an electro-optic modulator, an optical narrow-band notch filter, an optical splitter, the first photodetector, and an electrical combiner is utilized implement the microwave frequency down-conversion. The LO signal could be generated by the system itself without external LO signal source, and the frequency could be flexibly tuned by changing the frequency of the optical carrier output from the wavelength tunable laser.

(2) The electro-optic modulator with phase modulation function is used in the invention. The RF signal is loaded onto the lightwave with phase modulation, and there is no RF signal at the output of the photodetector for frequency down-conversion. It has the advantage of the complete RF isolation.

(3) According the application requirements, the RF signals with different frequencies could be down converted to the IF signal with same frequency. On the other hand, the RF signal with the same frequency could also be down converted to the IF signals with different frequencies. It has the advantage of flexible regulation.

In the figures: 1, wavelength tunable laser; 2, electro-optic modulator; 3, optical narrow-band notch filter; 4, optical splitter; 5, first photodetector; 6, electrical combiner; 7, second photodetector; 8, electrical low-pass filter.

DETAILED DESCRIPTION

Specific embodiments of the invention are further described by combining the drawings and the technical solutions.

Figure 1:
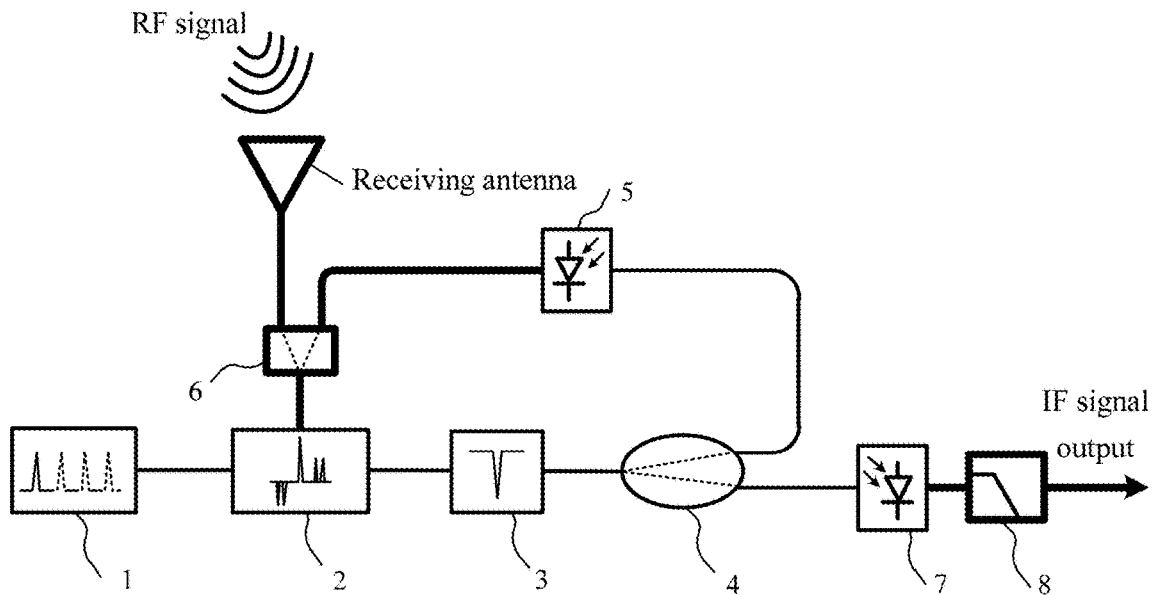
FIG. 1 is the structure diagram of the photonic microwave down-conversion system.
Figure 2:
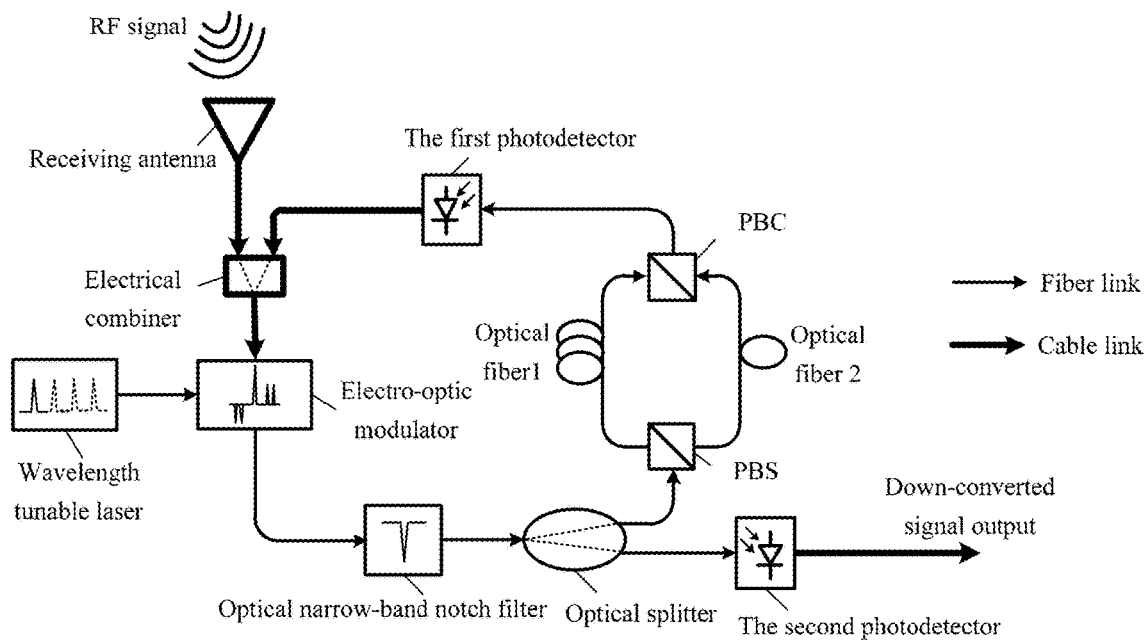
FIG. 2 is the structure diagram of the photonic microwave down-conversion system in the embodiment of the invention.

FIG. 2 is the structure diagram of the photonic microwave down-conversion system in the embodiment of the invention. It is composed of the wavelength tunable laser, the electro-optic modulator, the optical narrow-band notch filter, the optical splitter, the polarization beam splitter (PBS), the optical fiber a, the optical fiber b, the polarization beam combiner (PBC), the first photodetector, the electrical combiner, and the second photodetector.

The wavelength tunable laser, the electro-optic modulator, the optical narrow-band notch filter, the optical splitter, the PBS, the optical fiber a, the optical fiber b, the PBC, and the first photodetector are connected in sequence by optical fibers.

The lengths of optical fiber a and b are different.

The double loop is composed of the PBS, the fiber a, the fiber b, and the PBC.

The optical splitter and the first photodetector are connected by the double loop composed of the PBS, the fiber a, the fiber b and the PBC.

The electro-optic modulator is the phase modulator.

The first photodetector and the electrical combiner are connected by the cable.

The optical splitter and the second photodetector are connected by the optical fiber.

The electro-optic modulator, the optical narrow-band notch filter, the optical splitter, the PBS, the optical fiber a, the optical fiber b, the PBC, the first photodetector, and the electrical combiner are connected in sequence to established the oscillation loop. It has the function of generating the LO signal. The double loop composed of the PBS, the optical fiber a, the optical fiber b, and the PBC is used to suppress the side mode of the LO signal generated by the OEO, which can improve the stability of the LO signal.

Figure 3:
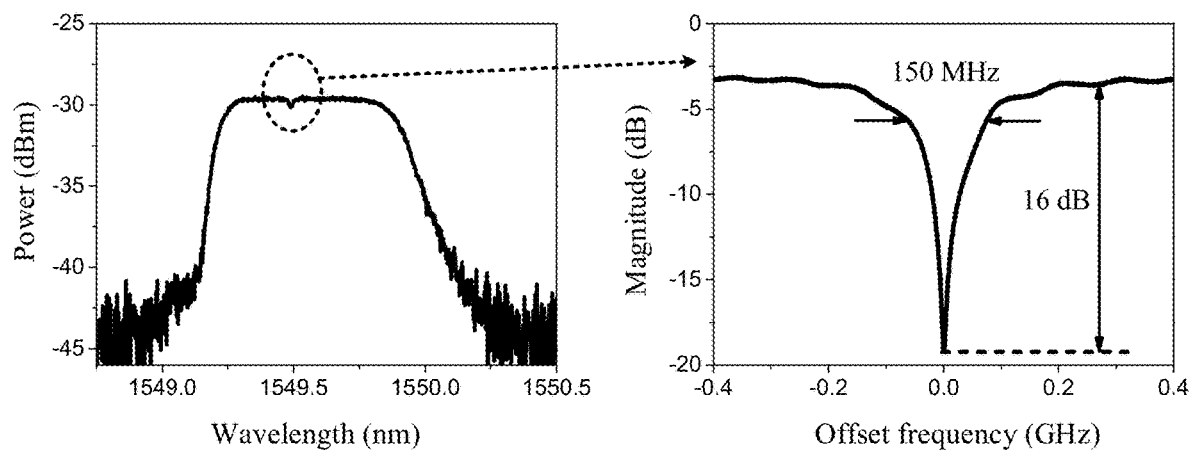
FIG. 3 is the filter response spectrum of the optical narrow-band notch filter in the embodiment of the invention.
Figure 4:
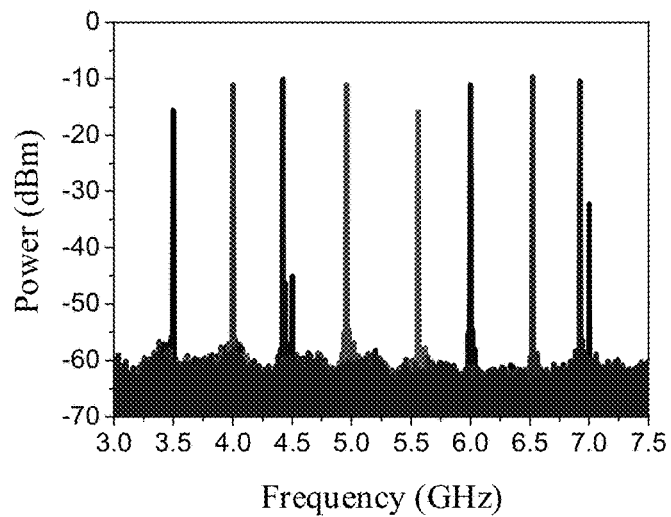
FIG. 4 is the measured spectrum diagram of the generated LO signals with different frequencies in the embodiment of the invention.
Figure 5:
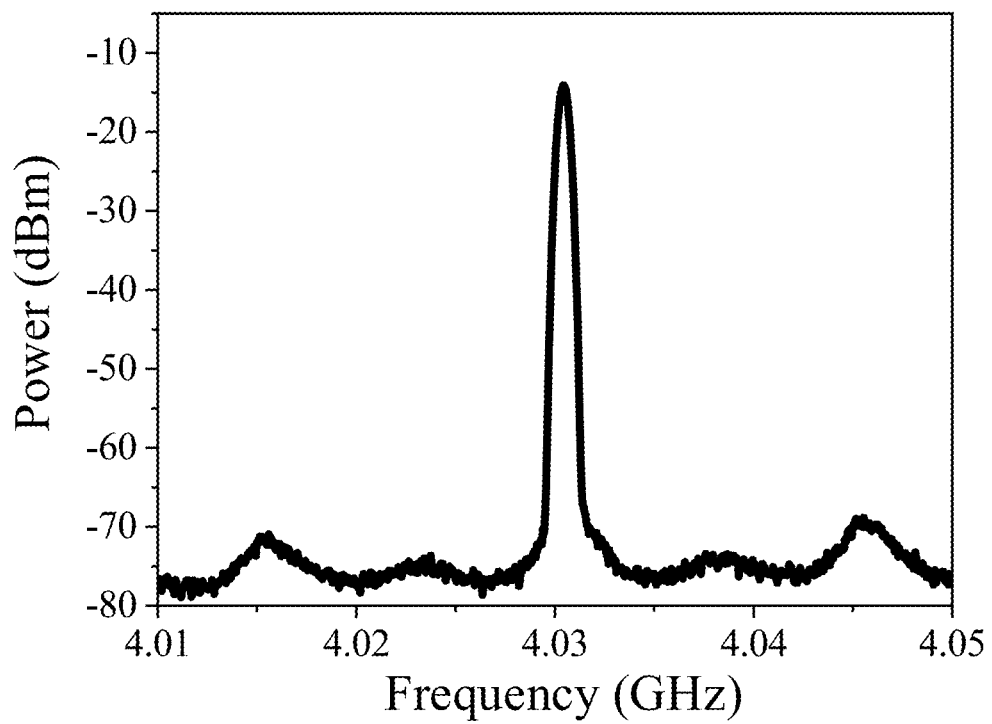
FIG. 5 (*a*) is the generated LO signal spectrum at a certain frequency in the embodiment of the invention, FIG. 5 (*b*) is the measured result of phase noise at a certain frequency in the embodiment of the invention.
Figure 5:
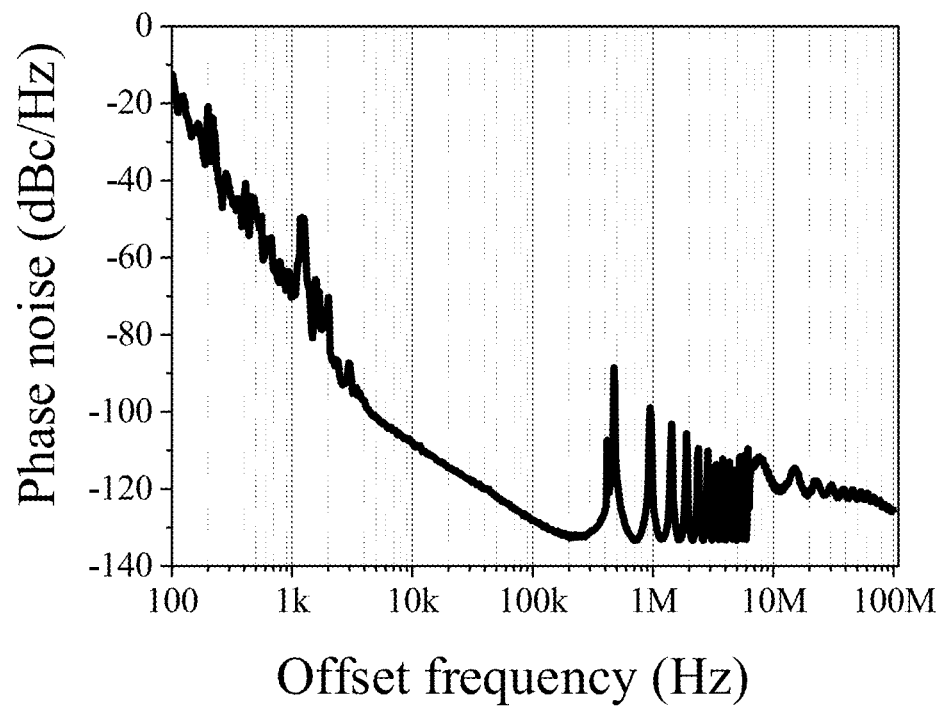

FIG. 3 is the filter response spectrum of the optical narrow-band notch filter in the embodiment of the invention. There is a notch at the center of the passband of the filter response. The frequency of the LO signal $f_{LO}$ generated by the oscillation loop is determined by the frequency of the lightwave from the wavelength tunable laser $f_C$ and notch center frequency $f_N$ of the optical narrow-band notch filter, which satisfies the relationship of $f_{LO}=f_C-f_N$. The frequency of the LO signal can be adjusted by changing the frequency of the lightwave from the wavelength tunable laser $f_C$. FIG. 4 is the measured spectrum of the generated LO signals with different frequencies by changing the lightwave frequency of the wavelength tunable laser $f_C$. It can be seen that the LO signals with the frequency range from 3.5 to 7 GHz can be generated by the system. The spectrum and the phase noise measurement results of the generated LO signal at 4.03 GHz are shown in FIGS. 5 (a) and (b), respectively. It can be seen that the power of the generated microwave LO signal is −14.1 dBm, and the phase noise is −107.9 dBc/Hz@10 kHz. The above results demonstrate that the LO signal with adjustable frequency and high quality can be generated without the external LO signal source.

The photonic microwave down-conversion process is as following: The optical carrier with the frequency of $f_C$ output from the wavelength tunable laser is fed to the optical input port of the electro-optic modulator. The RF signal received by the antenna and the LO signal returned from the first photodetector in the oscillation loop are combined together via the electrical combiner and fed to the RF input port of the electro-optic modulator.

Figure 6:
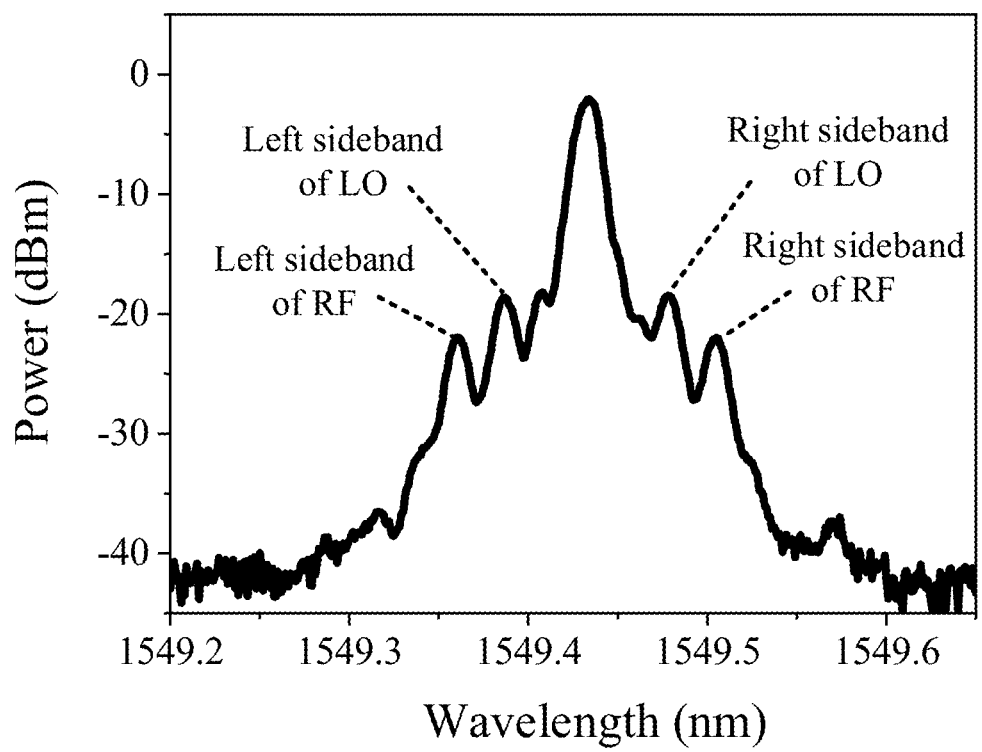
FIG. 6 (*a*) is the spectrogram of the optically carried microwave signals before entering the optical narrow-band notch filter in the embodiment of the invention, FIG. 6 (*b*) is the optically carried microwave signals output from the optical narrow-band notch filter in the embodiment of the present invention.
Figure 6:
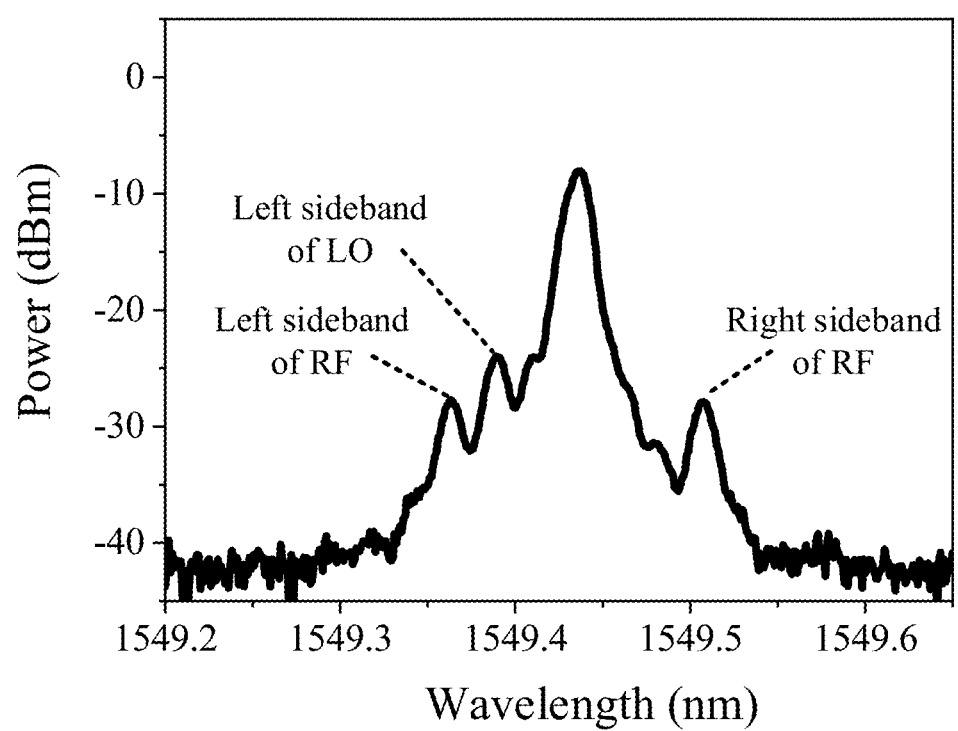

The RF signal and the LO signal are modulated on the optical carrier via the electro-optic modulator. The optically carried phase modulation microwave signals are output from the electro-optic modulator. FIGS. 6 (a) and (b) are the spectrograms of the optical microwave signal before and after entering the optical narrow-band notch filter, respectively. By comparing FIGS. 6 (a) and (b), it can be seen that the right sideband of the optical carried LO signal is filtered by the optical narrow-band notch filter.

The optically carried microwave signals are divided into two paths via the optical splitter. The first path enters the double loop composed of the PBS, optical fiber 1, optical fiber 2, and the PBC. The second path enters the second photodetector. The optically carried microwave signals output from the double loop are converted into electrical domain by the first photodetector. The LO signal is generated by frequency beating between the left sideband and the optical carrier of the optically carried LO signal. The frequency of the LO is $f_{LO}=f_C-f_N$. The left and right sidebands of the optically carried RF signal have a phase difference of t due to inherent property of the phase modulation. Therefore, the left and right sidebands of the optically carried RF signal cancel each other after frequency beating and no RF signal is output. The LO signal output from the first photodetector is fed to the RF input port of the electro-optic modulator via the electrical combiner, which acts as the required LO signal for the photonic microwave down-conversion.

The optically carried microwave signals from the second path separated from the optical splitter are converted into electrical domain via the second photodetector. The left and right sidebands of the optical RF signal have a phase difference of it due to the inherent property of the phase modulation. Therefore, the left and right sidebands of the optical RF signal cancel each other after frequency beating and no RF signal is output from the second photodetector. The complete RF isolation is achieved. In the second photodetector, the intermediate frequency (IF) signal is generated by the frequency beating between the left sidebands of the optically carried LO and RF signals. The LO signal is generated by the frequency beating between the left sideband of the optically carried LO and the optical carrier. The IF signal and the LO signal are output from the second photodetector.

Figure 7:
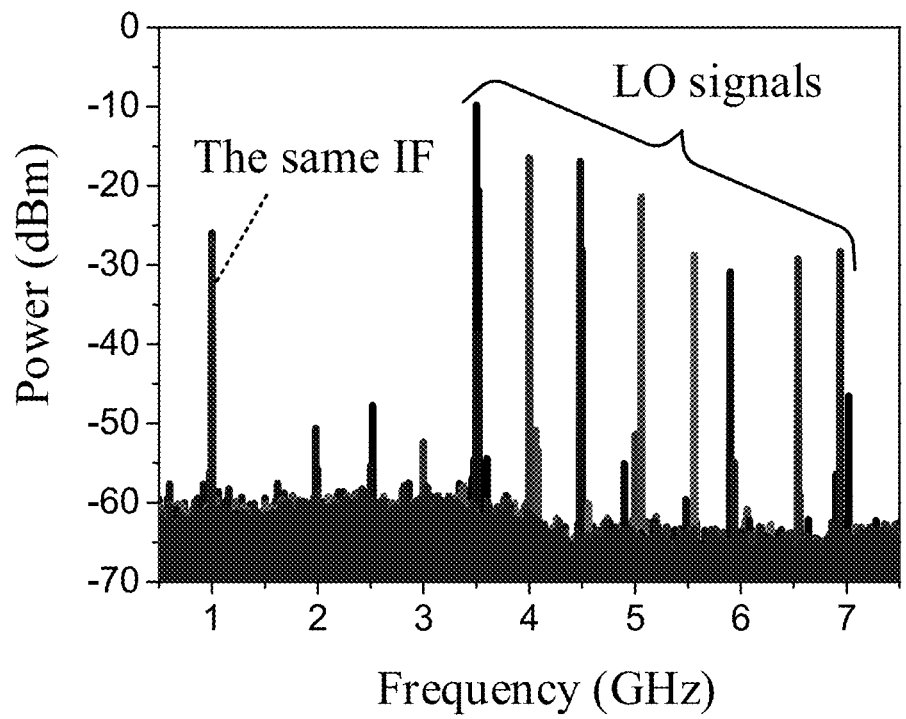
FIG. 7 is the measured spectrum diagram of the IF signal with the same frequency, which is down converted from the RF signals with different frequencies in the embodiment of the invention.
Figure 8:
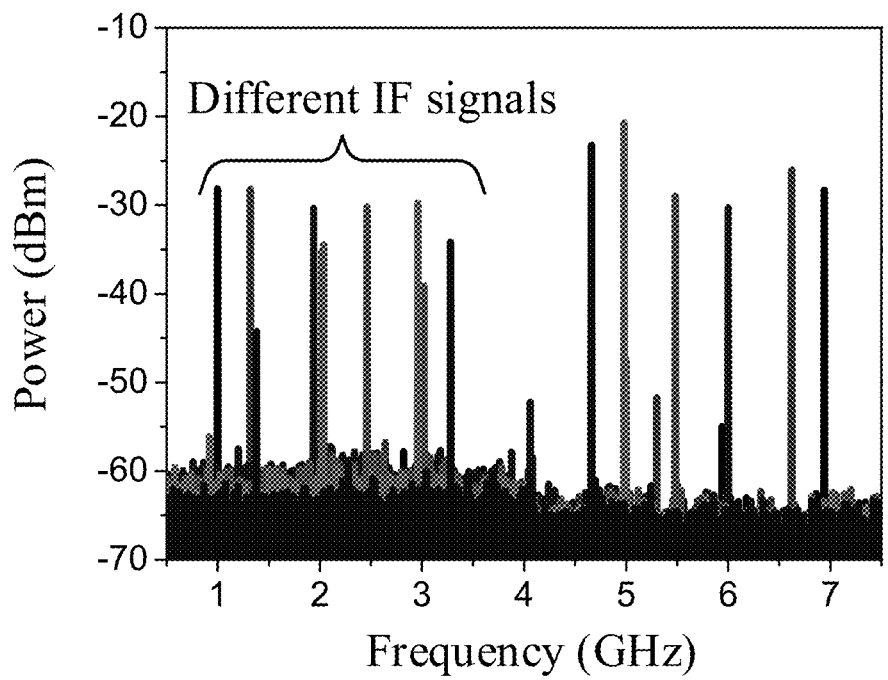
FIG. 8 is the measured spectrum diagram of the IF signals with different frequencies, which are down converted from the RF signal with the same frequency in the embodiment of the invention.

The down converted IF signal frequency $f_{IF}$ can be adjusted by changing the LO signal frequency $f_{LO}$. The LO signal frequency can be tuned by changing the lightwave frequency $f_C$ of the wavelength tunable laser. The RF signals with the frequencies of 4.5 GHz, 5 GHz, 5.48 GHz, 6.06 GHz, 6.56 GHz, 6.9 GHz, 7.54 GH and 7.94 GHz are input to the photonic microwave down-conversion system and the down converted IF signal with the same frequency of 1 GHz is measured and the results are shown in FIG. 7. It can be seen from FIG. 7 that, there is no RF signal in the measured spectrum, and the RF signal is isolated completely. FIG. 8 is the measured spectrum of the IF signals with the frequencies of 1 GHz, 1.32 GHz, 1.94 GHz, 2.46 GHz, 2.96 GHz and 3.28 GHz, which are down converted from the RF signal with the same frequency of 8 GHz. The above results show that the photonic microwave down-conversion system can not only down convert the RF signals with different frequencies to the IF signal with the same frequency, but also can down convert the RF signal with the same frequency to the IF signals with different frequencies. It can realize the flexible and adjustable down-conversion function.

The above contents are the further detailed description of the invention. The embodiments of the invention are not limited to the description. For those persons in the related technical field, it is possible to make some derivations and substitutions without departing from the spirit and scope of the invention. The derivations and substitutions should also be regarded as the protection scope of the invention.

The invention claimed is:

1. A photonic microwave down-conversion system, comprising a wavelength tunable laser, an electro-optic modulator, an optical narrow-band notch filter, an optical splitter, a first photodetector, an electrical combiner, a second photodetector, and an electrical low-pass filter;

the wavelength tunable laser, the electro-optic modulator, the optical narrow-band notch filter, the optical splitter and the first photodetector are connected in sequence by optical fibers;

the first photodetector and the electrical combiner are connected by a cable;

the electro-optic modulator, the optical narrow-band notch filter, the optical splitter, the first photodetector and the electrical combiner are connected in sequence to establish an oscillation loop;

the optical splitter and the second photodetector are connected by an optical fiber;

the second photodetector and the electrical low-pass filter are connected by a cable.

2. A photonic microwave down-conversion system according to claim 1, wherein the electro-optic modulator, optical narrow-band notch filter, optical splitter, the first photodetector and the electrical combiner are connected in sequence to establish the oscillation loop; it has the function of generating a local oscillator signal, namely LO signal; the frequency of the generated LO signal $f_{LO}$ is determined by the lightwave frequency $f_C$ of the wavelength of the tunable laser and the notch center frequency $f_N$ of the optical narrow-band notch filter, which satisfies the following relationship:

$$f_{LO}=f_C-f_N.$$

3. A photonic microwave down-conversion system according to claim 1, wherein the optical splitter and the first photodetector is a single-loop optical fiber connection, double-loop optical fiber connection or multiple-loop fiber connection.

4. A photonic microwave down-conversion system according to claim 3, wherein the electro-optical modulator in the photonic microwave down-conversion system has the function of phase modulation.

5. A photonic microwave down-conversion system according to claim 1, wherein the electro-optical modulator in the photonic microwave down-conversion system has the function of phase modulation.

6. A photonic microwave down-conversion method, wherein the implementation steps are as follows:

an optical carrier with the frequency of $f_C$ output from a wavelength tunable laser is fed to an optical input port of an electro-optic modulator; the RF signal received by an antenna and a LO signal returned from a first photodetector in an oscillation loop are combined together via an electrical combiner and fed to a RF input port of the electro-optic modulator; the RF signal and the LO signal are modulated on the optical carrier via the electro-optic modulator; the optically carried phase modulation microwave signals output from the electro-optic modulator are fed to an optical narrow-band notch filter; the right sideband of the optically carried LO signal is filtered out by the optical narrow-band notch filter; the optically carried microwave signals are divided into two paths via an optical splitter, the first path enters the first photodetector and the second path enters a second photodetector;

the optically carried microwave signals are converted into electrical domain by the first photodetector; the LO signal is generated by frequency beating between the left sideband and the optical carrier of the optically carried LO signal; the frequency of the LO is $f_{LO}=f_C-f_N$; the left and right sidebands of the optically carried RF signal have a phase difference of π due to the inherent property of phase modulation; therefore, the left and right sidebands of the optically carried RF signal cancel each other after frequency beating and no RF signal is output; the LO signal output from the first photodetector is fed to the RF input port of the electro-optic modulator via the electrical combiner, thus the LO signal oscillates back and forth in the loop and high quality LO signal with low phase noise is generated; the frequency of LO signal $f_{LO}$ can be tuned by changing the frequency $f_C$ of the optical carrier output from the wavelength tunable laser;

the optically carried microwave signals from the second path separated from the optical splitter are converted into electrical domain via the second photodetector; the left and right sidebands of the optically carried RF signal have a phase difference of it due to the inherent property of phase modulation; therefore, the left and right sidebands of the optically carried RF signal cancel each other after frequency beating and no RF signal is output from the second photodetector; the complete RF isolation is achieved;

in the second photodetector, an intermediate frequency signal is generated by the frequency beating between the left sidebands of optically carried LO and RF signals; the frequency of IF signal is:

$$f_{IF}=f_{RF}-f_{LO};$$

the LO signal is generated by frequency beating between the left sideband and the optical carrier of the optically carried LO signal; the LO signal output from the second photodetector is filtered out by an electrical low-pass filter, and the IF signal is obtained; the frequency of the down-converted IF signal $f_{IF}$ can be adjusted by changing the frequency of the LO signal $f_{LO}$, that is, by changing the frequency of the optical carrier $f_C$ from the wavelength tunable laser; as a result, the tunable down-conversion function is completed.

* * * * *